United States Patent [19]
Ishibe

[11] Patent Number: 5,492,623
[45] Date of Patent: Feb. 20, 1996

[54] LAMINATED FILTER MATERIAL, ITS FABRICATING METHOD AND FILTER USING A LAMINATED FILTER MATERIAL

[75] Inventor: Hideomi Ishibe, Hirakata, Japan

[73] Assignee: Nippon Seisen Co., Ltd., Osaka, Japan

[21] Appl. No.: 30,091

[22] PCT Filed: Oct. 5, 1992

[86] PCT No.: PCT/JP92/01323

§ 371 Date: Mar. 23, 1993

§ 102(e) Date: Mar. 23, 1993

[30] Foreign Application Priority Data

Oct. 7, 1991 [JP] Japan ..................... 3-289087

[51] Int. Cl.$^6$ ........................................ B01D 71/02
[52] U.S. Cl. .................. 210/232; 210/448; 210/453; 210/500.25
[58] Field of Search ................. 210/500.25, 453, 210/445, 446, 447, 448, 452, 232

[56] References Cited

U.S. PATENT DOCUMENTS

| | | | |
|---|---|---|---|
| 2,598,818 | 6/1952 | Muirhead | 210/453 X |
| 3,022,187 | 2/1962 | Eyraud et al. | 210/500.25 X |
| 3,127,668 | 4/1964 | Troy et al. | |
| 4,186,100 | 1/1980 | Mott | |
| 4,377,409 | 3/1983 | Ishibe | 75/5 R |
| 4,935,139 | 6/1990 | Davidsoh et al. | 210/500.25 X |

FOREIGN PATENT DOCUMENTS

| | | |
|---|---|---|
| 419799 | 4/1991 | European Pat. Off. |
| 55-142513 | 11/1980 | Japan |
| 56-8643 | 2/1981 | Japan |
| 63-66566 | 12/1988 | Japan |
| 1-018423 | 1/1989 | Japan |
| 64-58305 | 3/1989 | Japan |
| 1-139118 | 5/1989 | Japan |
| 195229 | 6/1989 | Japan |

OTHER PUBLICATIONS

"Pulvermetallurgische Bauelemente in der Verfahrenstechnik" by A. Fischer et al, Chemie. Ingenieur. Technik, vol. 62, No. 4, Apr. 1990, pp. 263–270.

Primary Examiner—Frank Spear
Attorney, Agent, or Firm—Birch, Stewart, Kolasch & Birch

[57] ABSTRACT

A laminated filter material for removing foreign materials from gas or liquid with high precision, its fabricating method and a filter using a laminated filter material are described. The laminated filter material comprises a support member of porous metal and a particle layer of fine particles laminated on a surface having asperities of the support member, by immersing the support member in a suspension of the particles without a binder, and evacuating the suspension through the support member. The method for fabricating includes the steps of preparing a suspension of particles finer than the average pore diameter of support member without using a binder, immersing the support member, and evacuating the suspension through the support member. The filter has a housing for supporting the laminated filter material, wherein the housing is provided with a metal attachment part having a surface contacting an end-face of the laminated filter material, and the attachment part and end-face of the laminated filter material are fixed by fusing the particle layer from the reverse side of the contacting surface of the attachment part.

3 Claims, 11 Drawing Sheets

LAMINATED FILTER MATERIAL, ITS FABRICATING METHOD AND FILTER USING A LAMINATED FILTER MATERIAL

FIELD OF THE INVENTION

The present invention relates to a laminated filter material, its fabricating method and a filter using a laminated filter material having improved filterability.

BACKGROUND OF THE INVENTION

Recently, improvements in filtering precision is desired for the filtration of liquids to remove foreign materials of about several microns in the high polymer industrial field and filtration of gases to remove foreign materials of 0.1 μm or less, for example, from process gas used in the electronics field mainly for semiconductors. A reduction of pressure loss in filtration is also demanded.

Specifically, filtration systems used to filter process gas used in manufacturing semiconductors must be heat resistant for baking treatment, and corrosion resistant, because a corrosive gas is often be used. Furthermore, characteristics such as toughness and flexibility, ease of mounting on a housing and ease in after-processing are also desired. Here, the baking treatment is to remove harmful moisture adhered to and existing in the filtration system by heating an entire filtration system, including the filter, for example, to about 200 to 400 deg. C.

Although high polymer materials, ceramics, metals and the like are used as filter materials, filter material made of high polymer materials are limited in use because of poor heat resistance and corrosion resistance. Filter material using ceramics are inferior in toughness and flexibility and easily crack. Moreover, such filter materials have the disadvantage in that the part of the filter material connected with the housing must be sealed using a non-heat resistant material, such as a high elasticity rubber, because it cannot be welded even when contained in a housing for use in filtration of a gas.

In addition, in a filter for precision filtration, whether for gas or for liquid, generation of impurities from the filter itself must be minimized. Such impurities considerably deteriorate the filtering precision by becoming entrained in the filtered liquid or gas. In addition to water, hydrocarbon and the like, which are generated from a high polymer filter itself when using a filter or packings of a high polymer material, are such impurities. Binders, such as organic binders that are mixed to preserve the shape of the filter when the filter is formed specifically by using powders and particles, are also sources of impurities.

Although such binders are mostly evaporated and removed by sintering and calcination of preliminary molding, binder present in a deeper part of the filter tend to be incompletely removed and remain therein. Thus, the binders may exist as carbides formed by sintering and calcination. Therefore, it is an essential requirement that such impurities are not included in a filter used for precision filtration, particularly a filter used for filtering process gas.

The so-called wet suction molding for forming a particle layer on an entire surface of a support member, by immersing a porous support member in a suspension with fine particles mixed therein and reducing the inner pressure is suggested, for example, in Japanese Patent Publication No. 56-8643 (hereinafter called "the former"), and Japanese Patent Publication No. 63-66566 (hereinafter called "the latter").

The former discloses a method of forming a particle layer on a support layer by preparing a suspension of powders without using a binder. The former also discloses a method of using powders as is without preparing a suspension.

It is required in the former, however, that a tubular body be used as a support member, wherein the support member is rotated for adhesion by centrifugal force. Moreover, when using a suspension, pressurization is required from inside by using an elastic rubber and static compression die to increase the adhesion strength of a powder layer (see line 33, column 5 to line 39, column 6 of the Patent Publication).

However, with such a method, it is difficult to obtain a high efficiency filter, since only a tubular shaped material having a filtering layer in the inner surface thereof can be molded. The process is also complicated, and the filtering layer tends to be uneven in thickness, because the filtering layer is in contact with the suspension flow, which may cause separation of the laminated powders. Further, the porosity is reduced by pressure-contact between powders due to the effect of centrifugal force and compression.

In the latter, a support member substantially comprising a tubular body is disclosed, which is contacted with a suspension flow after being impregnated with a liquid. Besides the fact that the process is complicated, a residual binder is present since the method uses a suspension having an organic binder (lines 37 to 39, column 5 of the Patent Publication).

The present invention was achieved by finding That a sufficient preservation of shape for sintering can be obtained by simple immersion and evacuation in a suspension, without the use of a binder and without application of centrifugal force or the like. Hence, it is an object of the present invention to provide a laminated filter material with high filtration precision, low pressure loss and homogeneity without the use of a binder. A further object of the present invention is to provide its fabricating method and a filter using the laminated filter material.

DISCLOSURE OF THE INVENTION

A first invention relates to a laminated filter material comprising a support member of porous metal, and a particle layer of particles that are finer than the average pore diameter of the pores of the support member, wherein the particle layer is laminated on at least one surface of the support member. The surface of the support member has asperities thereon, and the particle layer is laminated thereto, so as to form a boundary between the particle layer and the support member that is aligned along the asperities of the surface of the support member by immersing the support member in a suspension of the particles, without the use of a binder, and evacuating the suspension through the support member. The particles are then integrally fixed to the support member by sintering.

A second invention relates to a method for fabricating a laminated filter material comprising the steps of 1) obtaining a porous support member having asperities on at least one surface thereof;

2) preparing a suspension of particles that are finer than the average pore diameter of the pores of support member and that are dispersed in the suspension without using a binder;

3) obtaining a raw laminated body composed of the support member and a particle layer laminated on the surface of the support member having asperities, so as to form a boundary between the particle layer and the support member that is aligned along the asperities of the surface of the support member, by immersing the support member in the suspension of particles and evacuating the suspension through the support member from the reverse side of the surface having asperities;

4) removing the raw laminated body from the suspension; and 5) sintering the raw laminated body to obtain the laminated filter material.

A third invention relates to a filter comprising the above mentioned laminated filter material and a housing supporting the laminated filter material. The housing has a metallic attachment part having a surface contacting an end face of the laminated filter material, wherein the end face is fixed to the metal attachment by fusing the particle layer from the reverse side of the surface of the attachment part that is in contact with the end face of the laminated filter material.

The laminated filter material comprises a sintered metal, and is therefore superior in strength, heat resistance, processability, attachability and the like. Meanwhile, the particle layer is maintained in a rigid bond, since it is aligned along the asperities of the support member. Furthermore, since the laminated filter material is formed by immersing and evacuating the support member in a suspension of particles, without a binder, and without the application of centrifugal force or compression, the filtering efficiency of the laminated filter material is improved because of an increase in porosity, reduction in pressure loss, and homogeneity of the laminated filter material. Moreover, clean high precision filtering, without the generation of impurities is possible. In addition, because a support member is used, strength can be maintained while the thickness of the particle layer can be reduced.

Since the filter is formed from the laminated filter material, the filter is superior in filtering characteristic and no breakage or crack occurs, because the laminated filter material is welded to the housing from the reverse side of the surface of the attachment part of the housing, and is attachable to the housing without the use of a high polymer material as a packing, which thereby improves the heat resistance.

Furthermore, with regard to the fabricating method, because the particles are dispersed into the suspension without using a binder, and the particle layer is formed by evacuation, a laminated filter material having improved homogeneity, high porosity and high filtering efficiency can be made in various shapes in a simple process.

BRIEF DESCRIPTION OF THE DRAWINGS

An embodiment of the present invention will now be described by way of example, referring to the attached drawings, in which.

DESCRIPTION OF THE PREFERRED EMBODIMENTS

Figure 1:
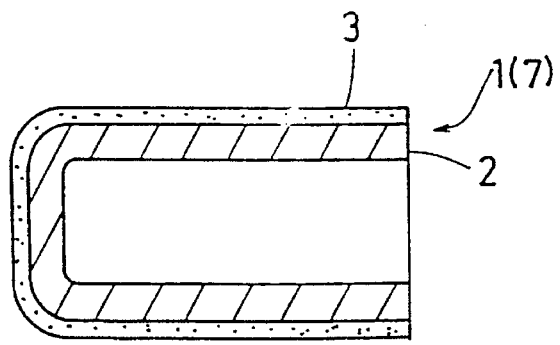
FIG. 1 is a sectional view showing an embodiment of the invention.

An embodiment for carrying out the present invention is described in the drawings as follows:

FIG. 1 is an embodiment of the present invention illustrating a laminated filter material 1 having a cup-shape, in which the laminated filter material comprises a support member 2 and a particle layer 3 fixed on an outside surface of the support member 2.

It is necessary that the support member 2 have low pressure loss, sufficient strength, and pores that are formed uniformly and continuously from one surface to the other surface. A sintered body made from metal powder is used in this embodiment as the support member 2.

Figure 2:
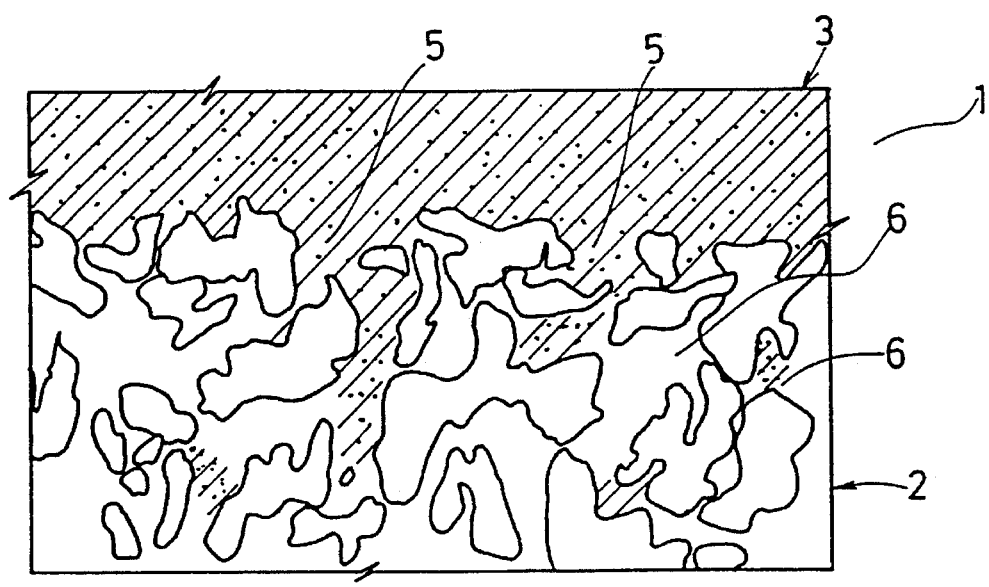
FIG. 2 is a magnified sectional view showing an example of a boundary surface.

Metal powder, such as atomized powder, with an average diameter of 20 to 100 times (preferably 40 to 80 times) the average diameter of the particles of the particle layer 3, is used, thereby forming the sufficiently large asperities 5 on the outside surface of the support member 2 by the outer surface shape of the metal powder, as shown in FIG. 2. Therefore, metal powder, such as atomized powder of approximately #140/200 mesh to 200/250 mesh, is used. The grain size of the powder of the support member 2 influences the smoothness of the outside surface of the laminated filter material 1, since asperities are likely to be formed on the surface of the particle layer 3 when the grain size of the powder of the support member 2 is too rough. It is desirable that the outside surface of the laminated filter material 1 is smooth, not only to provide a good appearance, but also to prevent foreign matter from adhering to the surface. Therefore, a powder of approximately 200/250 mesh is considered a comparatively desirable powder.

Further, stainless steel powder is used to obtain corrosion resistance. Especially, the amorphous powder increases the percentage of pores and is able to control pressure loss and to increase the adhesive property of particles.

Figure 3:
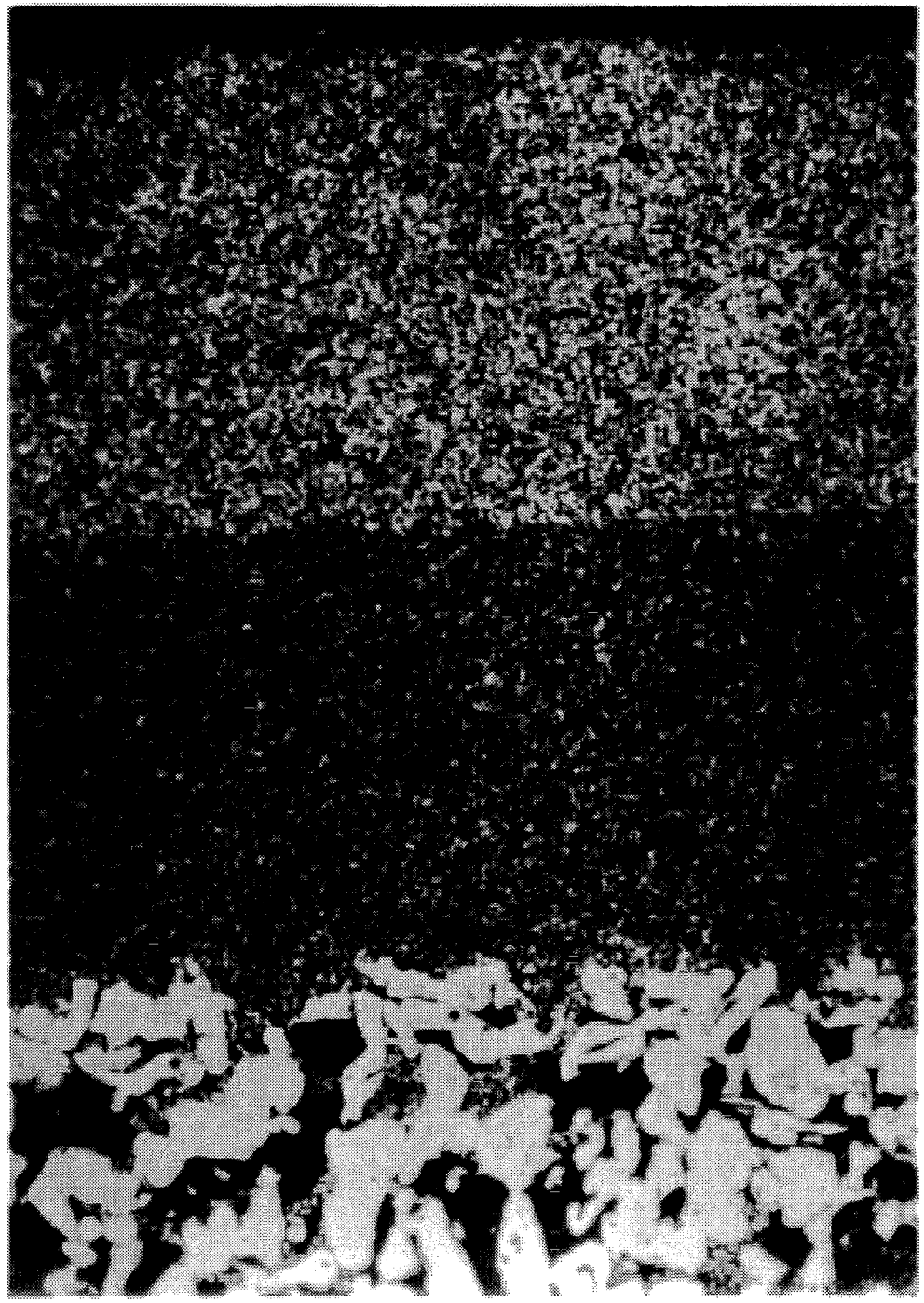
FIG. 3 is a magnified micrograph showing an example of a support member and a particle layer.

The average diameter of the pores of the support member 2 is 20 to 100 µm, and the percentage of pores is 40 to 50% so as to reduce pressure loss. It is possible for the particles of the particle layer 3 to enter into the asperities of the surface of the support member 2, as shown in FIG. 2 and FIG. 3, but this entry of the particles does not pose a significant problem.

The support member 2 is formed, for example, by cold press under approximately 1 to 3 ton/cm² pressure, without using a binder, and by sintering in a vacuum oven at approximately 1100° C. for 60 minutes.

In addition to the stainless steel powder, metal powders such as titanium and Hastelloy (registered trademark of Haynes International) may be used to form the support member 2. A sintered body of short fibers or long fibers of metal may be used instead of a sintered body of metal powder. Further, powder metallurgy, fiber metallurgy, as well as porous bodies such as foamed metal parts and wire rod mesh may be used.

Figure 4:
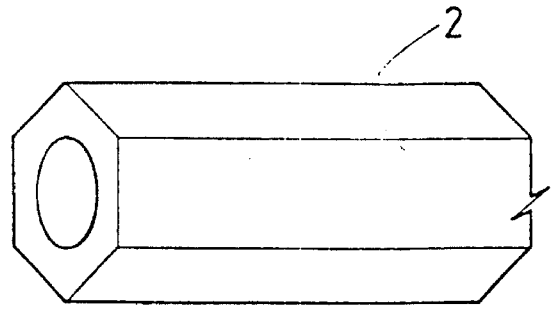
FIG. 4 is a perspective view showing an example of a support member.
Figure 5:
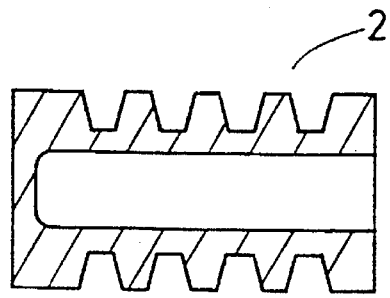
FIG. 5 is a sectional view showing a second example of a support member.

The support member 2 may be formed into a sheet-like body, cylindrical body, square tube-like body, bellow-like body as shown in FIG. 4 and FIG. 5, cup-type body, or conical body such as a sphere or a cone. Furthermore, the powder distribution may also be graded to mix two or more different powders or to form a multiple layer structure.

Figure 6:
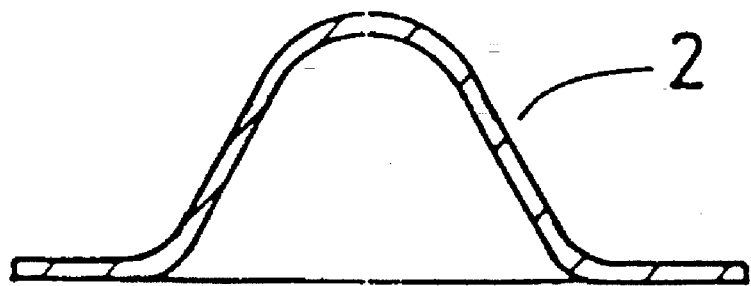
FIG. 6 is a sectional view showing a third example of a support member.

FIG. 6 shows a hat-shaped support member 2 that is formed by molding the sintered sheet material of metal fibers randomly arranged, so that features such as strength and pore characteristic can be easily selected. When using a sheet material of stainless steel fibers of approximately 4 to 20 μm diameter, a support member 2 having an average pore diameter of approximately 10 μm and a thickness of 1 to 3 mm is obtained.

When a mesh, which is a wire net, is used as the support member 2, the size of the wire rod and the pore diameter are correlated, wherein a mesh of thin wire rod must be used to obtain fine pores. Because the use of such thin wire rod deteriorates strength, a plurality of mesh (for example, 2 to 20 meshes or preferably 2 to 5 meshes) having different wire diameter and mesh pitch and so forth, in addition to the same mesh, may be integrally formed into a laminated plate body, so that the laminated plate body may be formed into various shapes by machining such as bending and welding.

The particle layer 3 will be described.

As particles of the particle layer 3, metal powder may be used, as well as short fibers. It is preferable to use particles of the same kind of metal as the support member 2. In case stainless steel is used, SUS316L, SUS317L and so forth of good corrosion resistance are suitable. Inconel (registered trademark of The International Nickel CO.,), Monel metal (registered trademark of The International Nickel CO.,), Nickel or Hastelloy C type or X type (registered trademark of Haynes International) with high corrosion resistance may be used for filtering corrosive gas such as HCl and HF.

Metal short fibers are obtained by mechanically cutting the long fibers of stainless steel into short fibers. In the alternative, the length of the crystal of long fibers of stainless steel, which are proposed by the applicant of the present invention in the Japanese Examined Patent Publication No. 63-63645, is adjusted, and the long fibers in the grain boundary of the crystal thereof is cut into short fibers by a chemical method used to selectively corrode and cut the metal fibers in the grain boundary, so that the metal short fibers may be preferably used. The metal short fibers cut by the above-mentioned chemical method take the form of a column having the same diameter over its entire length, free from burr at the end section, that is, free from a hook-like protrusion in a direction to intersect with the longitudinal axis. According to such an arrangement, it is possible to reduce entanglement between the metal short fibers and to form a homogeneous filtering particle layer.

The diameter of the particles is smaller than the average pore diameter of the support member 2. A fiber diameter of 0.5 to 15 μm, or preferably 0.5 to 4 μm, is used for metal short fibers. It should be noted that the metal short fibers having fine diameters of from 0.5 to 2 μm was obtained by research and development made during recent years by the applicant of the present invention.

Fibers having a diameter of 15 μm or greater results in large filtering pores, and deteriorate the mutual adhesive property as well. Although fibers of finer diameter are preferable, it is difficult to manufacture fibers having a diameter of 0.5 μm or less. By using metal short fibers with fine diameter of 0.5 μm to 15 μm, a filter with fine filtering pores can be obtained. Then, the diameter of filtering pores and the distribution of filtering pores can be made uniform, and metal binding property between the support member 2 as well as between particles can be improved.

As shown in FIG. 2 and FIG. 3 and as described above, the boundary surface between the particle layer 3 and the support member 2 lies along the asperities 5 of the support member 2, wherein the particles enter into the pore 6 of the support member 2. As a result, adhesion of the particles to the support member 2 can be increased and the strength of the laminated filter material after sintering can be improved.

The diameter of the metal short fiber 2 is an average diameter measured at each position and in each direction over the entire length of each metal short fiber.

A short fiber having a diameter measured at each position and in each direction that varies within a range of 30% of the average diameter may be used. In addition, different types of the short fiber, wherein the average diameters of each type of fiber are different from the other within a range of 20% of the average diameter, may be used.

The aspect ratio of the metal short fiber is set at 2 to 15. The aspect ratio is a value obtained by dividing the length of short fibers by its diameter, that is, length/diameter. When the aspect ratio is greater than 15, sufficient dispersion of short fibers becomes difficult and short fibers that are sintered in lumps are present, which thereby impairs the uniformity of the fiber. Also, the formation of three-dimensional pores become difficult. When the aspect ratio is less than 2, the metal short fibers approach powder from, and thus reduces the percentage of pore, which increase pressure loss. Therefore, the aspect ratio of the metal short fibers is preferably in a range of 4 to 8.

With respect to the metal short fibers that are cut by the chemical method discussed above, metal short fibers of long and short aspect ratio are mixed in a normal distribution. Therefore, the aspect ratio is defined as the average aspect ratio of the metal short fibers in this case. Variations in distribution can be reduced by setting the aspect ratio to 4 to 8 as described above.

Powder in spherical shape, or irregular shape which is manufactured by, for example, the atomized method, can also be used as the particles of the particle layer. In such a case, it is possible to mix powders having a plurality of different particle diameters or shapes. Fine powder of atomized metal having small particle diameter of less than 15 μm, or preferably less than 6 μm, may be used as the metal short fibers. By forming the powder into a sphere, pore distribution can be equalized. However, it is preferable to use powder of large apparent density in order to laminate the powder easily by suction method.

Figure 7:
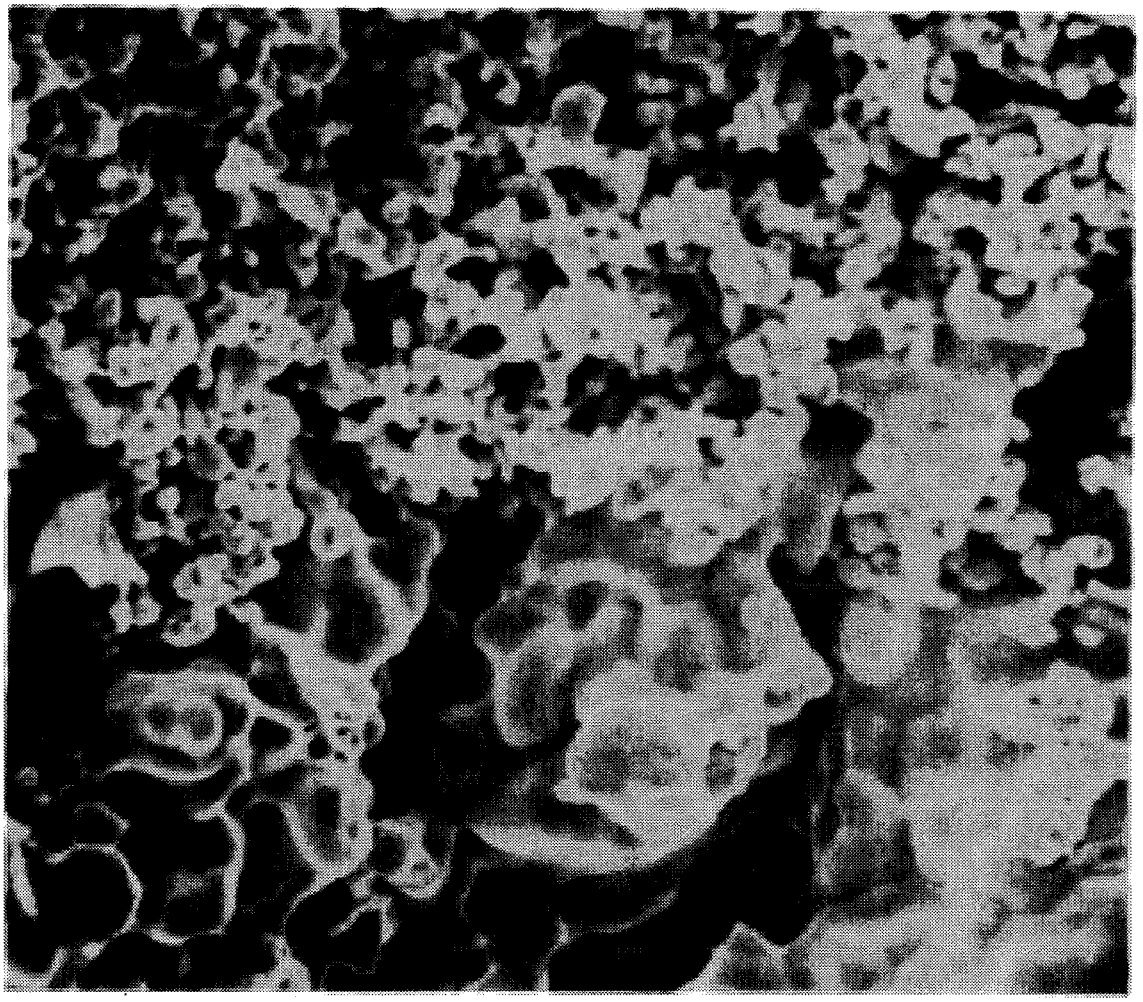
FIG. 7 is a magnified micrograph showing an embodiment of the invention using spherical powders for the particle layer.

FIG. 7 is a diagram that is enlarged by approximately 800 times that shows the boundary section of the support member 2 and the particle layer 3 of the laminated filter material 1, wherein atomized spherical powder is used as the particles of the particle layer.

Further, in addition to using only metal short fibers, it is possible to adjust filtering pores by using a mixed powder of metal short fibers and metal powder.

The particle layer 3 is a layer used for filtering. Therefore, it is preferable that pores in the particle layer are made continuous, with as small and as uniform diameter as possible, and that the particle layer have as large a percentage of pores as possible. To accomplish this objective, the percentage of pores is set in a range of 50% to 80%. It is possible to reduce pressure loss and improve filtering performance by setting the percentage of pores in the particle layer 3, to 50% or greater as described above. The percentage of pores is the volume of void per unit volume of a sintered layer 3, and is calculated from the volume and weight of the particle layer 3, or by image analysis.

Such a high percentage of pores is provided in the laminated layer of particles, which is laminated, without using any binder, on the support member 2 by dipping the support member 2 into a suspension of the particles and by evacuating the support member 2. Because centrifugal force and static pressure are not used in laminating the particle layer 3, it is possible to increase the percentage of pores. Furthermore, it is possible to form the particle layer 3 along the asperities 5 of the support member 2.

The particle layer 3 is formed to have almost a uniform thickness. Preferably, the thickness of the particle layer 3 is less than ½ or more preferably less than ¼ and greater than 1/20 of the thickness of the laminated filter material 1, for example, the thickness can be 0.2 to 2.0 mm, or preferably 0.3 to 0.5 mm. Even if the thickness is greater, the particle layer 3 can demonstrate good filtering performance. The particle layer 3 may also be a plurality of layers that uses particles of different diameters.

The support member 2 and the particle layer 3 are made into one body by sintering.

Figure 8:
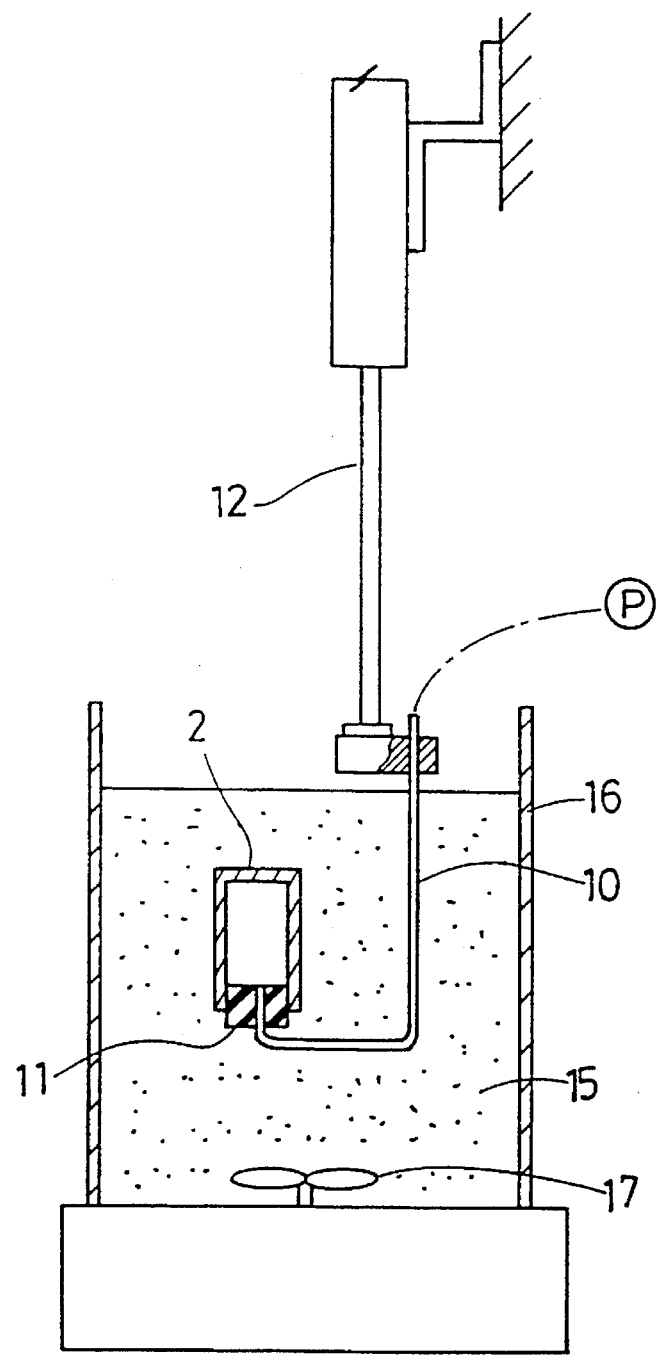
FIG. 8 is a sectional view showing an example of fabricating apparatus.

FIG. 8 shows an embodiment of the manufacturing method of the present invention, illustrating the formation of the cup-like laminated filter material 1 as an example.

First, the support member 2 is prepared by sintering the cup-like body formed by cold press.

By using powder whose diameter is large as compared with that of the particle layer 3, the asperities 5 are formed on the outside surface of the support member 2, while pores which continue from the outside surface to the inside surface are formed in the concave section of the asperities 5.

An opening of the cup-like support member 2 is sealed by a silicone rubber plug 11, through which a conduit 10 for suction, which is attached to an elevating device 12, passes. A vacuum pump P is connected to the conduit 10.

Then, the suspension 15 is prepared. In the liquid of the suspension 15 are suspended particles for forming the particle layer 3. Water or alcohol is used as the liquid. It is desirable to use water of high purity, such as pure water. Isopropyl alcohol and the like may be used as the alcohol. Further, binder, such as resin binder, should not be mixed. The suspension 15 is stored in a container 16, which is deep enough to immerse the support member 2 completely.

The laminated filter material 1, which is clean and free from impurities, is produced in a short process, since a heat treatment or high level washing process to remove binder is unnecessary.

Concentration of tile particles in the suspension 15 is a high concentration of over 200 g per liter. With this arrangement, the time for evacuation can be reduced and a defect-free filter of stable quality can be obtained. The concentration of the particles in the suspension largely influences the pore distribution. When the concentration is excessively low, pin holes are formed in the particle layer 3, and the percentage of pores after sintering becomes large, with the pore diameter moving towards the coarse side.

Because the diameter of the pores in the support member 2 is larger than the size of the particles, if the concentration of particles in the suspension is low, particles pass through the support member 2 to form the pin holes in the particle layer 3 before the laminated layer is produced by bridge formation. Therefore, the concentration of particle in the suspension is set to over 200 g per liter, or preferably over 300 g per liter. The upper limit of the concentration of particles in the suspension is considered to be 1000 g per liter.

The container 16 of large capacity is used to maintain the suspension, and the stirrer 17 is employed to stir the suspension. The suspension is replenished with a suspension of the same concentration when the level of the suspension is lowered due to consumption thereof.

The elevating device 12 is operated to immerse the support member 2 into the suspension 15. The elevating device 12 employs an air cylinder, for example, to allow rapid immersion. The immersion time is controlled precisely by a timer.

Prior to or after immersing the support member 2, the vacuum pump P is operated to reduce the pressure in the support member 2. In case the vacuum pump is operated before immersion, the suspension 15 is not evacuated until the support member 2 is completely immersed in the suspension 15. Therefore, variations of the thickness of the particle layer 3 becomes relatively small.

Evacuation is performed at approximately 0.1 to 0.9 kg/cm$^2$ (76 to 680 mmHg) or preferably 76 to 228 mmHg. By this, the particles dispersed in the suspension 15 are evacuated sequentially onto the outside surface of the support member 2 so as to form the particle layer 3, wherein the particles enter into the inside of the pore 6 of the support member 2 and are accumulated along the asperities 5.

According to the arrangement described above, the particle layer 3 will have a pore percentage of approximately 50 to 80%. The suction pressure corresponds to the formation pressure of the particle layer 3, which allows the percentage of pores to be changed by adjustment of the suction pressure. However, because high pressure reduction is necessary for draining after formation, it is preferable that the evacuation is performed at a pressure up to approximately 76 to 228 mmHg as described above. Further, processing time can be reduced by increasing the suction pressure.

The particle layer 3 is formed on one surface, that is, the outside surface of the support member 2 in the manner described above. The concentration of the suspension in the container 16 is virtually unchanged, because the evacuated liquid is discharged as is. Therefore, it is possible to maintain the desired concentration simply by replenishing the suspension 15.

After suction and formation, the plug 11 is removed and the liquid is removed in a dryer. It is possible to maintain the shape of particle layer 3 while removing the support member 2 from the suspension 15, disconnecting the plug 11 and removal of the liquid.

Figure 9:
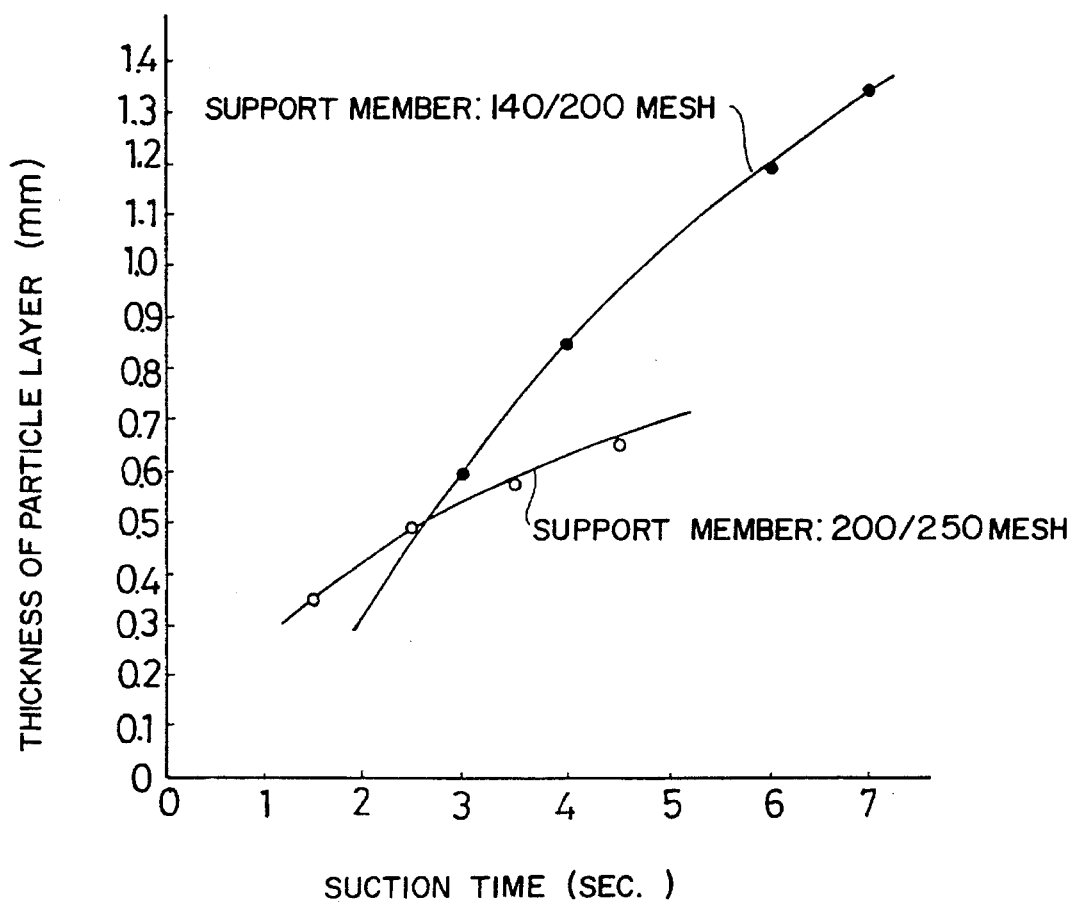
FIG. 9 is a diagram showing the relationship between the particle size of powdery bodies of the support member and the thickness of the particle layer.

FIG. 9 shows the relationship between the processing time and the thickness of the particle layer 3, in connection with the support members 2 of sintered powder of 140/200 mesh and 200/250 mesh, wherein the particle layer 3 is formed from particles comprising metal short fibers with a diameter of 2.5 μm and an aspect ratio of 6, at a suspension concentration of 300 g per liter and 400 cc per minute of suction speed.

If the thickness of the particle layer 3 exceeds a certain thickness, there is not much difference in particle collecting performance. However, the thickness is considered to have an influence on the pressure loss. When the concentration of the suspension 15 and the suction pressure are constant, the thickness of the particle layer 3 can be adjusted by the suction time, but the pressure loss is high and the particle layer 3 becomes thin when the grain size of the powder of the support member 2 is fine. On the other hand, when the grain size of the support member 2 is fine, the bridge of the particles is formed quickly after the start of suction. Then, for short suction times, thickness of the particle layer 3 is greater when the grain size of the support member 2 is fine. Therefore, it is shown in FIG. 9 that the support member 2 of fine grain size is not greatly influenced by the difference of the suction time, but is stable.

By processing the support member 2 in the manner described above, a raw laminated body 7, which is composed of the support member 2 and the particle layer 3 laminated in almost uniform thickness over the circumference of the support member 2, is obtained.

To accomplish the lamination process, a plurality of suspensions of different concentration is prepared and the particle layer 3 can be formed with a plurality of laminated structures by performing the lamination processes in order. Further, it is also possible to suspend two or more different types of particles in one suspension.

The raw laminated body 7 is sintered after drying. In the case of stainless steel, the sintering process is performed in a vacuum furnace, or inactive or hydrogen gas atmosphere furnace, for example, wherein the raw laminated body 7 is held in the furnace for 5 minutes to 6 hours at a heating temperature of 900° to 1500° C., depending on the quality of material. By raising the temperature of the furnace while avoiding a temperature rise exceeding 20° C. per minute or preferably 10° C. per minute, it is possible to prevent cracks and the like in the relatively brittle particle layer 3 formed by the laminating process.

By the sintering process described above, the particles of the raw laminated body 7 are adhered to each other and to the powder of the support member 2, so as to form a solid integral body. The sintering conditions are determined according to the quality of material and properties of the particles.

Figure 10:
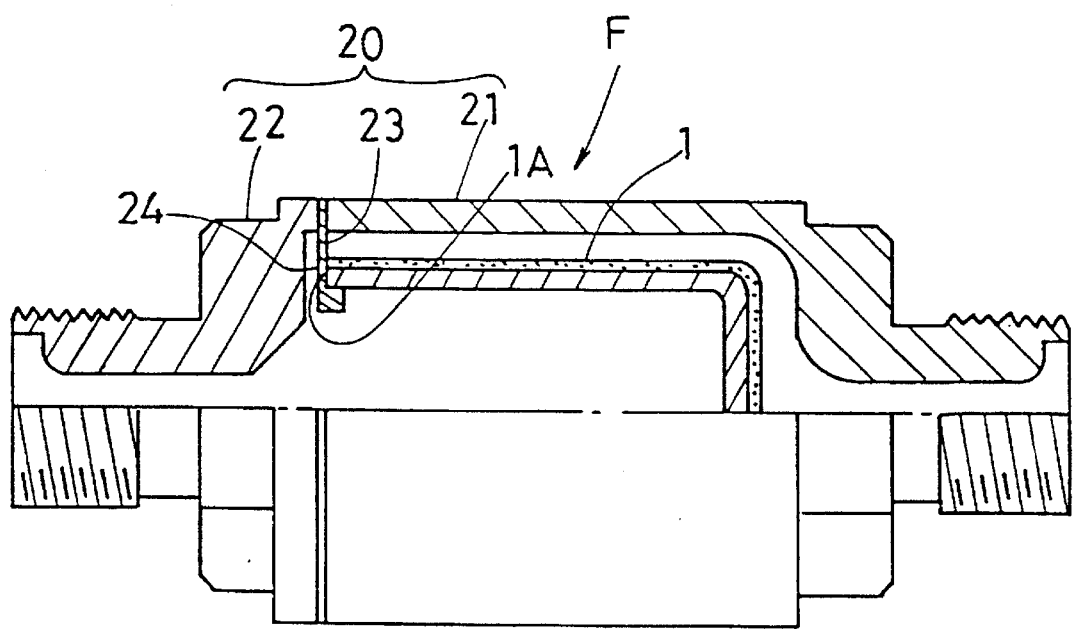
FIG. 10 is a sectional view showing an embodiment of a filter.

The filter, which uses the laminated filter material, will be described. The filter F comprises, as shown in FIG. 10, a cup-shaped laminated filter material 1 and a housing 20 containing the laminated filter material 1 therein.

The housing 20 comprises a first, a second and a third split parts 21, 22 and 23. The first split part 21 has a cylindrical base with an inner hole for housing the laminated filter material 1, a first threaded connecter projecting at an end of the cylindrical base, and a first passage communicated between the inner hole and the end of the threaded connecter. The second split part 22 has a cap body to close the inner hole, a second threaded connecter projecting at an end of the cap body, and a second passage communicated between the inner hole and the end of the second threaded connecter. The third split part 23 has a ring-shaped metallic body 24 which is held between the first and second split parts 21, 22 and, in this embodiment, the third split part 23 works as an attachment part fixing the laminated filter material 1.

The attachment part 23 has a surface contacting an opening end-face 1A of the laminated filter material 1. The contacting surface and the opening end-face 1A are fixed to each other by plasma welding from the reverse side of the contacting surface of the attachment part. By this process, it is possible to prevent cracks that are likely to be involved in welding.

Figure 11:
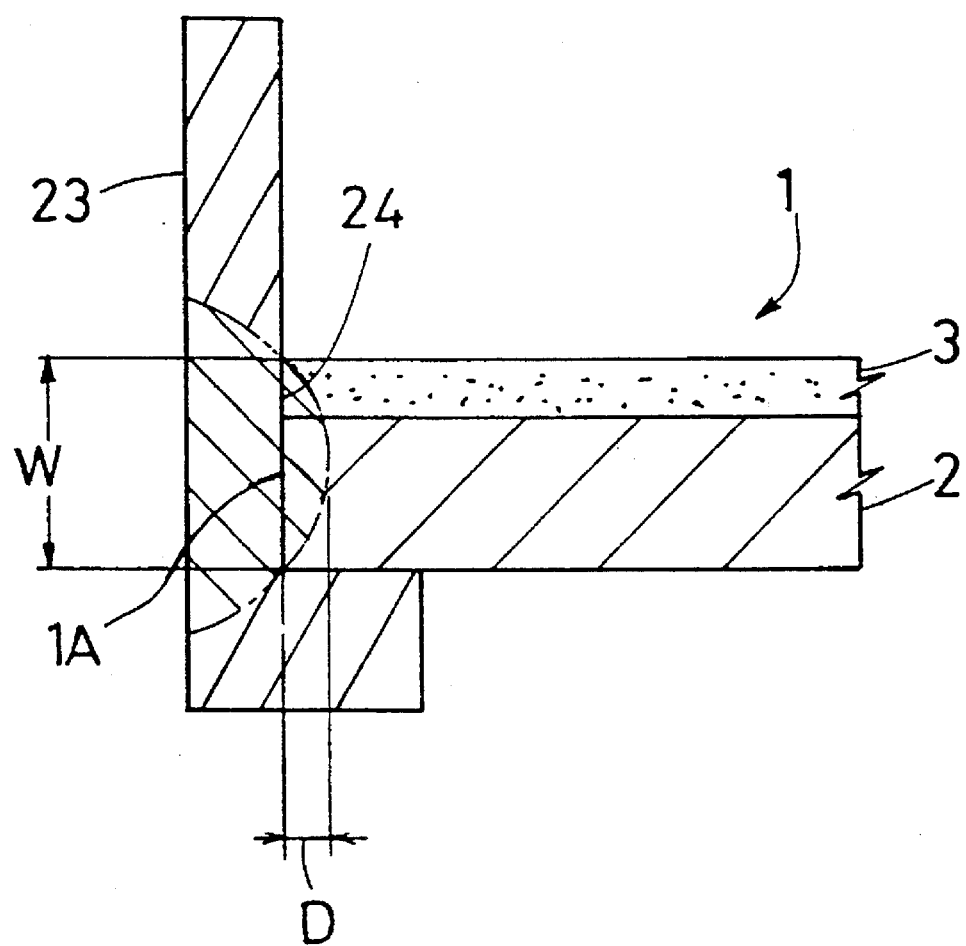
FIG. 11 is a magnified sectional view of weld metal part.

As shown in FIG. 11, at least a part of the particle layer 3 is fused during welding. By this process, a positive seal between the attachment part 23 and the laminated filter material 1 is made possible, and the unfiltered fluid is prevented from flowing out from the outlet. In the welded section, the fusion depth D can be made smaller than the fusion width W, thereby welding a wide width of the filter while controlling the reduction in the filtering area. Preferably, the fusion depth D is held to be approximately less than 5 mm.

According to the embodiment of the present invention, it is possible to weld the opening end-face 1A of the laminated filter material 1 directly to the second split part 22 without using the third split part 23. In this case, the second split part 22 works as an attachment part. Further, even when the laminated filter material 1 is a flat-shaped filter, for example, it is possible to prevent cracks and the like by fixing the circumferential endface of the laminated filter material 1 by such method.

EXAMPLE

The support member shown in FIG. 1 is immersed for 2.0 second in a suspension of a metal short fiber of 316 L stainless steel having a fiber diameter of 2.5 μm and average aspect ratio of 6 suspended in water at a concentration of 300 g/liter, to obtain the raw laminated molding body having a particle layer of 0.4 mm in thickness. The support member was molded and sintered by using stainless steel powders of 200/250 in mesh. After drying the raw laminated molding body, the raw laminated molding body was sintered in a vacuum environment at 1000 degrees C. for 30 minutes to form the laminated filter material. This example is referred to as Embodiment. The Embodiment has a beautiful surface and fine pores homogeneously formed in the particle layer.

Average pore diameter: 1.8 μm

Average porosity: 58%

Comparison Examples 1, 2 and 3, which were available in the market for high precision filtering, were purchased. Comparison Examples 1 and 2 are ceramic filters, and Comparison Example 3 is of a stainless steel type, wherein filter members are overlapped in a bellows-like fashion to form multiple layers.

The Embodiment and Comparison Examples were measured for filtering characteristic.

Test 1

Figure 12:
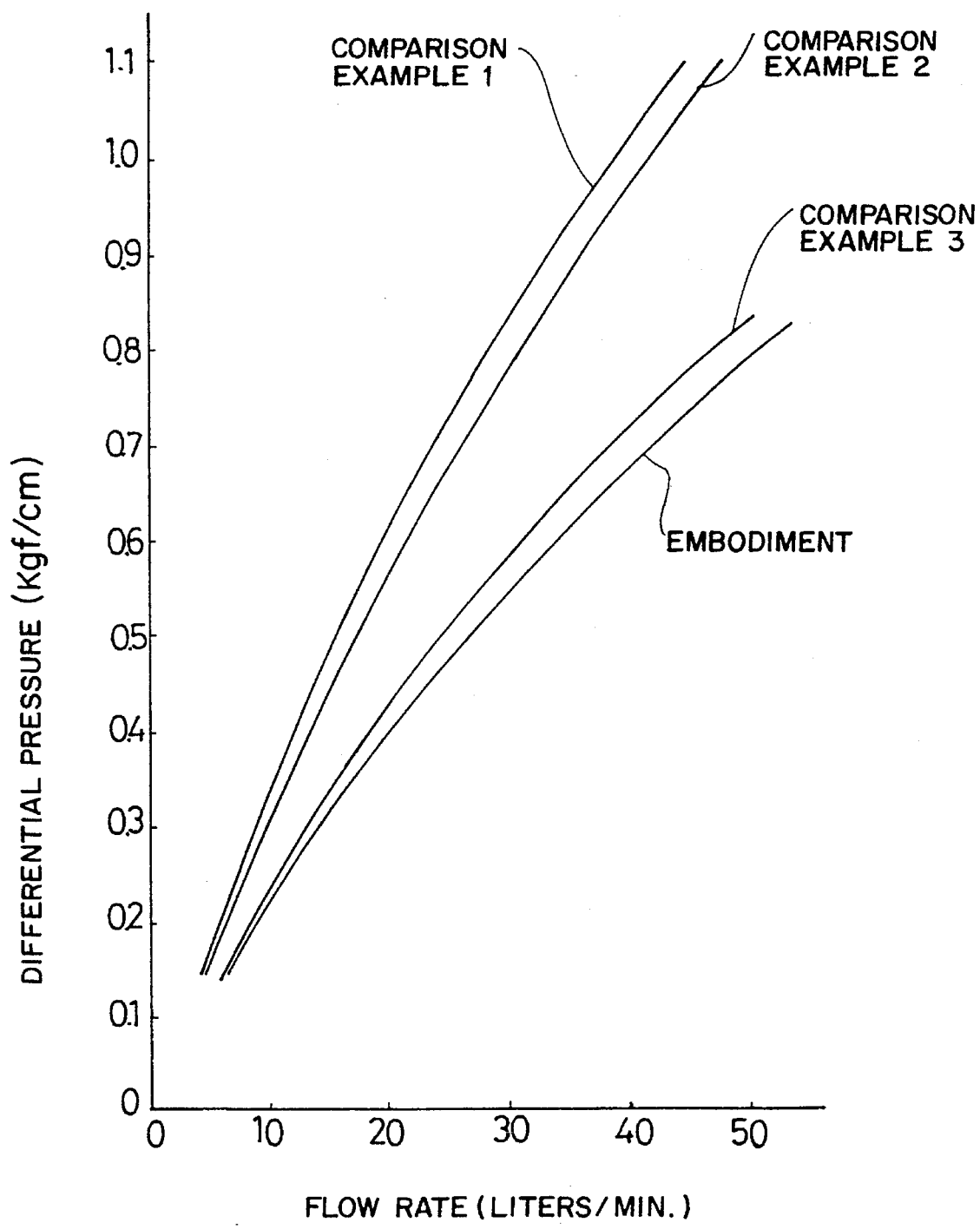
FIG. 12 is a diagram showing the flow rate characteristic.

The measurement result of flow rate characteristics of the Embodiment and Comparison Examples is shown in FIG. 12 (the relationship of flow rate to differential pressure was measured by using $N_2$ gas in the condition that the secondary side open to the atmosphere).

Comparison Example 3 is relatively low in pressure loss, while Comparison Examples 1 and 2 are high in pressure loss. The Embodiment is lower in pressure loss than any of the Comparison Examples. Therefore, the Embodiment is a high precision filter with a low pressure loss. With regard to filtering area of the Embodiment and Comparison Examples, with the Embodiment as 1, Comparison Examples 1 and 2 are 1.5, and Comparison Example is about 2, hence the Embodiment is the smallest.

Test 2

Particle Capturing Performance:

The particle capturing performance was measured by using an aerosol with fine DOP (dioctyl phthalate) particles.

Measurement conditions

Aerosol : Multidispersion DOP particles Distribution of diameter 0.02 to 0.3 μm (presumed)

Flow rate: 15 liters/minute

Particle concentration: $2.8 \times 10^5$/cc

Measurement time: The number of outflow particles in 30 minutes measured in 10 sec.unit Total flow rate at 15×30=450 liters Counting of particles: Concentrated nuclear counter . . . 5 cc per second (9 liter in total)

Shape of filter: Every sample was built in a housing having a joint in measurement.

Pretreatment of filter: Backwashed by clean IPA (isopropyl alcohol), then dried.

The number of outflow particles during the flow of 9 liters are as follows;

Embodiment - - - 0

Comparison example 1 - - - 39

Comparison example 2 - - - 29

Comparison example 3 - - - 11

The Embodiment is quite preferable with the number of outflow particles being few.

Test 3

Ventilation Resistance and Bubble Point Pressure:

The result of measurements of ventilation resistance and bubble point pressure, which were measured by changing the thickness of the Embodiment, was as follows (the ventilation resistance is a differential pressure at 1 liter/minute of flow rate).

| Thickness of particle layer (mm) | 0.325 | 0.5 | 0.575 | 0.65 | 0.75 |
|---|---|---|---|---|---|
| Ventilation resistance (mmAq) | 116 | 173 | 200 | 219 | 243 |
| Initial Bubble point pressure (mmAq) | 3786 | 3830 | 3864 | 3854 | 3751 |
| Point-of-intersection Bubble point pressure (mmAq) | 4418 | 4540 | 4589 | 4589 | 4629 |

Here, the bubble point pressure is specified in "Filterable Particle Size Test", JIS B8536, and measured by using isopropyl alcohol. The initial bubble point pressure means a pressure when a bubble is generated for the first time. The point-of-intersection bubble point pressure is calculated from a graph showing the relationship of pressure to flow rate, and means a pressure at a point at which a curve in the graph with larger rate of variation intersects a curve with smaller rate of variation. Therefore, a value of (Point-of-intersection Bubble point pressure (mmAq) / Initial Bubble point pressure (mmAq)) closer to 1 means the dispersion of the pore diameter is smaller, and thereby a superior filter member.

In the embodiments, the bubble point values show stable values within each conditions, and the rise due to an increase in thickness is not very significant. A point-of-intersection value of about 4500 mmAq is a very high value, and means that a filter with low pressure loss and high precision, which was conventionally unavailable, is obtained.

Test 4

Figure 13:
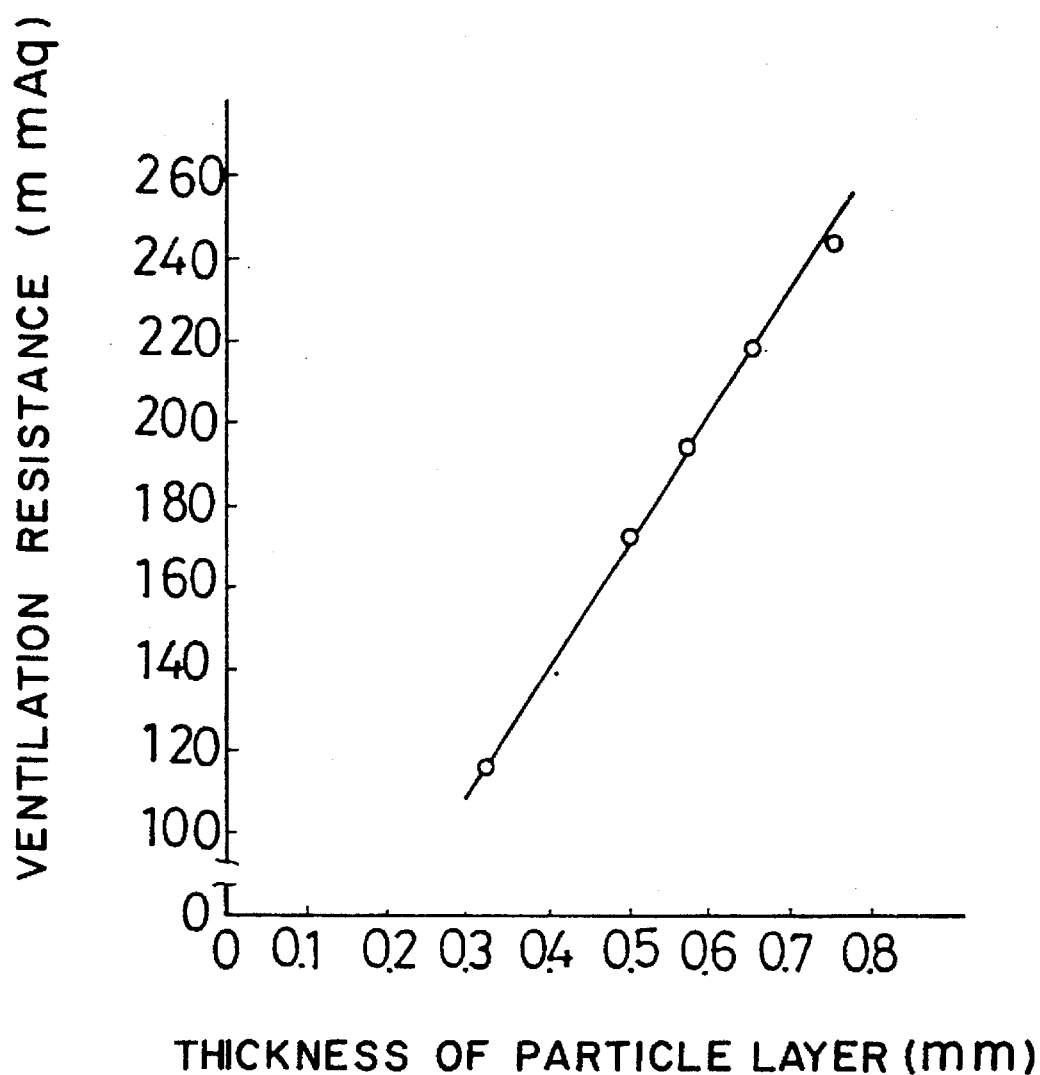
FIG. 13 is a diagram showing the relationship between the thickness of the particle layer and the flow rate characteristics.

The relationship between thickness and ventilation resistance of the Embodiment is shown in FIG. 13.

As depicted in the figure, the thickness and ventilation resistance have a linear relationship, which is shown by the following equation.

$$\Delta P = 307\, t$$

$\Delta P$: Ventilation resistance (mmAq)

t: Thickness of fibrous layer (mm)

Such a clear linear relationship between the thickness and ventilation resistance shows that the distribution density is constant even when the thickness varies, due to the very homogeneous structure of the particle layer. The variation in thickness is small over the entire filter surface.

Therefore, since the thickness of the particle layer is optionally adjustable by varying the suction time, and a ventilation resistance according to the thickness can be obtained, the characteristics are confirmed by controlling the thickness.

What is claimed is:

1. A filter comprising a laminated filter material and a housing supporting said laminated filter material, wherein said laminated filter material has an end face and comprises a support member having asperities on at least one surface, and a particle layer of particles comprising metal short fibers having a diameter of 0.5 to 15 μm and an aspect ratio of 2 to 15, wherein said particle layer is laminated on said at least one surface having asperities of said support member by immersing said support member in a suspension of said particles without a binder, evacuating said suspension through said support member, and integrally fusing said particles to said support member by sintering, to thereby obtain said particle layer and a boundary between said particle layer and said support member that is aligned along said asperities of said support member; and said housing comprises a metal attachment part having a surface contacting said end face of said laminated filter material, said end face being fixed to said metal attachment by fusing said metal attachment part from the reverse side of the surface in contact with said end face of said laminated filter material.

2. The filter according to claim 1, wherein said housing further comprises a container body having a plurality of split parts to contain said laminated filter material.

3. The filter according to claim 1, wherein the fusion depth of the fused part is smaller than the fusion width.

* * * * *